United States Patent [19]

Fehring

[11] Patent Number: 5,070,984

[45] Date of Patent: Dec. 10, 1991

[54] ADJUSTABLE CENTRIFUGAL CLUTCH

[76] Inventor: Thomas C. Fehring, 5167 Michael Anthony La., Cincinnati, Ohio 45247

[21] Appl. No.: 602,098

[22] Filed: Oct. 22, 1990

[51] Int. Cl.$^5$ .................... F16D 13/75; F16D 43/08
[52] U.S. Cl. .......................... 192/105 B; 192/110 R; 192/111 B
[58] Field of Search ............ 192/105 B, 111 B, 70.25, 192/70.23, 110 R

[56] References Cited

U.S. PATENT DOCUMENTS

| | | | |
|---|---|---|---|
| 834,499 | 10/1906 | Sturtevant | 192/105 B |
| 887,779 | 5/1908 | Dixon | 192/111 B |
| 1,239,778 | 9/1917 | Farmer et al. | 192/111 B X |
| 1,552,012 | 9/1925 | Searcy | 192/105 B |
| 1,720,766 | 7/1929 | Spahr | 192/105 B |
| 1,843,194 | 2/1932 | Banker | 192/105 BA |
| 1,994,588 | 3/1935 | Nakashian | 192/105 B X |
| 2,018,834 | 10/1935 | Church | 192/111 B X |
| 2,244,169 | 6/1941 | Miller | 192/105 B |
| 2,721,639 | 10/1955 | Miller | 192/105 B X |
| 3,171,524 | 3/1965 | Croft et al. | |
| 3,962,934 | 6/1976 | Boutin | 192/105 B X |

FOREIGN PATENT DOCUMENTS 965250  7/1964  United Kingdom ............ 192/165 B

*Primary Examiner*—Rodney H. Bonck
*Attorney, Agent, or Firm*—Wood, Herron & Evans

[57] ABSTRACT

An adjustable centrifugal clutch is disclosed which allows compensation to be made for wear on mating frictional members. The centrifugal clutch comprises a rotating input housing, a rotatable output shaft, clutch rings, clutch disks, a pressure plate, centrifugal weights, and an adjustment collar for varying the distance between the centrifugal weights and the pressure plate. As friction wears away material from the clutch rings and the clutch disks disposed therebetween, the adjustment collar is advanced upwardly within the light housing thereby maintaining a constant engagement speed.

9 Claims, 3 Drawing Sheets

ADJUSTABLE CENTRIFUGAL CLUTCH

BACKGROUND OF THE INVENTION

1. Field of the Invention

This invention relates generally to clutches, and more particularly to centrifugal clutches.

2. Description of the Prior Art

Centrifugal clutches are well known in the art. In essence, these devices, sometimes known as frictional contact axial clutches, utilize mating frictional members to transfer torque from an input housing to an output shaft This is accomplished by harnessing the effects of centrifugal force upon radially translatable elements to generate axial movement and ultimately axial thrust. This axial thrust is applied upon an input housing frictional member which, by interacting with an output shaft frictional member, effectively transmits the input housing torque to the output, or driven shaft.

In this type of axial clutch, the radially translatable elements are simple weights which surround the output shaft. Typically these weights are radially spring biased away from the input housing and against the output shaft. During operation, as the angular velocity of the input housing increases, likewise the centrifugal force developed by each of these weights increases. When the centrifugal force associated with each weight exceeds the preload force developed in each of the weight springs, these weights begin to move radially outwardly. These weights are commonly designed with a slanted surface such that continued outward radial movement of the weights will result in corresponding axial movement of a pressure plate which has a coacting slanted surface abutting the slanted surface of the weights. As the weights translate radially outwardly, the pressure plate continues translating axially compressing a series of clutch rings which are fixedly attached within the input housing. These clutch rings have disposed therebetween the peripheral edges of clutch disks, the disks themselves being splined to the output, or driven shaft. When the axial force applied by the pressure plate develops a sufficiently large frictional force between the clutch rings and the clutch disks so as to preclude slippage therebetween, the clutch becomes engaged and the output shaft commences rotation. The input housing angular velocity at which this engagement occurs is often referred to as the clutch "engagement speed."

While this most basic machine is well known and has widespread application, it nonetheless has several drawbacks. First, since the vehicle through which torque is transmitted in this machine is friction, frictional wear is an inherent disadvantage. Consequently, the operating characteristics of the clutch are transient, and will therefore change with time. Specifically, wear between the clutch rings and the clutch disks results in an ever-increasing clutch engagement speed. The engagement speed increases because the pressure plate must continually travel a further axial distance to generate the non-slip condition between clutch disks and clutch plates to account for the material lost from each to frictional contact. The traditional centrifugal clutch is lacking in that there is no mechanism with which to easily adjust axially the pressure plate and coacting weights to account for this frictional wear. Second, should one wish to selectively adjust the clutch engagement speed, the weight/spring combination of the clutch must be varied, and hence, the weights, springs, or both must be removed and replaced with substitutes.

For both of these scenarios the traditional clutch assembly must inevitably be disassembled. To correct a worn clutch, the clutch rings, clutch plates, or both must be replaced. And, to selectively change the engagement speed of the clutch, the weights, springs, or both must be replaced. It is desirable, then, for a centrifugal clutch to have some means by which one can externally adjust the clutch to both 1) account for frictional wear, and 2) selectively change the clutch engagement speed, but without having to disassemble the clutch assembly.

It has therefore been one object of the present invention to provide a centrifugal clutch with means for effecting fine tuning adjustments to account for the change in engagement speed due to frictional wear of the clutch rings and disks, thereby maintaining a constant engagement speed.

Another object of the present invention has been to provide a centrifugal clutch with external means for selectively adjusting the clutch engagement speed.

Yet another object of the present invention has been to provide a centrifugal clutch wherein replacing the weights and springs therein to change the engagement speed is more easily facilitated.

SUMMARY OF THE INVENTION

The present invention is an improved centrifugal clutch having means for externally adjusting the engagement speed and for fine tuning the clutch to compensate for frictional wear in order to maintain a constant engagement speed. The present invention also facilitates the convenient replacing of the clutch weights and springs when that is required to obtain the desired engagement speed.

The present invention is a centrifugal clutch comprising a rotating input housing, a rotatable output shaft, clutch rings, clutch disks, a pressure plate, centrifugal weights, and means for axially adjusting the weights relative to the pressure plate. The input housing has at least one pair of clutch rings fixedly connected within it. At least one clutch disk is mounted for rotation with the output shaft, with each clutch disk having a peripheral edge disposed intermediate each pair of clutch rings. An axially translatable pressure plate is fixedly connected to the lowermost clutch ring, and has a lower side having means for defining a radially extending and downwardly sloping surface. Disposed beneath the pressure plate are axially translatable and radially slideable centrifugal weights. Each of these weights has an upper side having means thereon for defining a radially extending and downwardly sloping surface, slideably mateable with the pressure plate sloping surface means. The weights are biased toward the output shaft and away from the input housing via springs. An adjustment collar abuts against the lower sides of the weights and has means for selectively adjusting and locating it relative to the input housing, thereby being operable to variably space the sloping surface means of the weights towards or away from the sloping surface means of the pressure plate.

Threads may be utilized for selectively adjusting the adjustment collar with respect to the input housing. In this case the input housing would be threaded and the adjustment collar would be mateably threaded for engagement therein or thereon.

To define a radially extending and downwardly sloping surface, the pressure plate could be a plurality of guide projections, wherein each guide projection is essentially a radially-extending and downwardly sloping fin. With this pressure plate design, the centrifugal weights would each have complementing notches in their upper surfaces which would be engagable with the guide projections, and which would also be radially extending and downwardly sloping. These notches would serve to not only advance the pressure plate axially as the centrifugal weights translate radially, but would also serve to direct the weights in a strict radial path.

To provide resistance for each centrifugal weight, compression springs may be utilized which extend between the radially outermost side of the weight and the inside wall of the input housing.

One advantage of the present invention is that a centrifugal clutch has been provided which enables one to make fine tuning adjustments to account for the change in the clutch engagement speed due to frictional wear of the clutch rings and clutch disks, and thereby enabling one to maintain a constant engagement speed.

Another advantage of the present invention is that a centrifugal clutch has been provided wherein one may selectively adjust the clutch engagement speed.

Yet another advantage of the present invention is that a centrifugal clutch has been provided wherein replacing the weights and springs therein to change the clutch engagement speed is more easily facilitated.

A further advantage of the present invention is that the need to immediately replace clutch disks and rings upon their becoming the slightest bit worn in order to maintain a constant engagement speed has been obviated.

These and other objects and advantages of the present invention will become more readily apparent during the following detailed description taken in conjunction with the drawings herein, in which:

DESCRIPTION OF THE PREFERRED EMBODIMENT

Figure 1A:
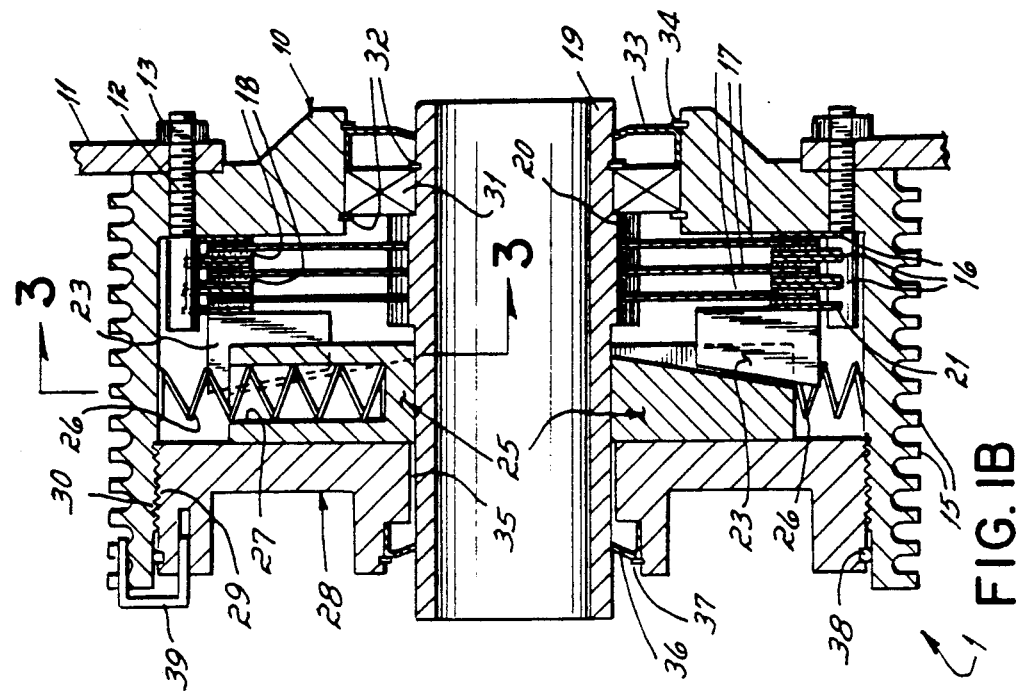
FIG. 1A is a cross-sectional view of a clutch embodying the present invention.
Figure 1B:
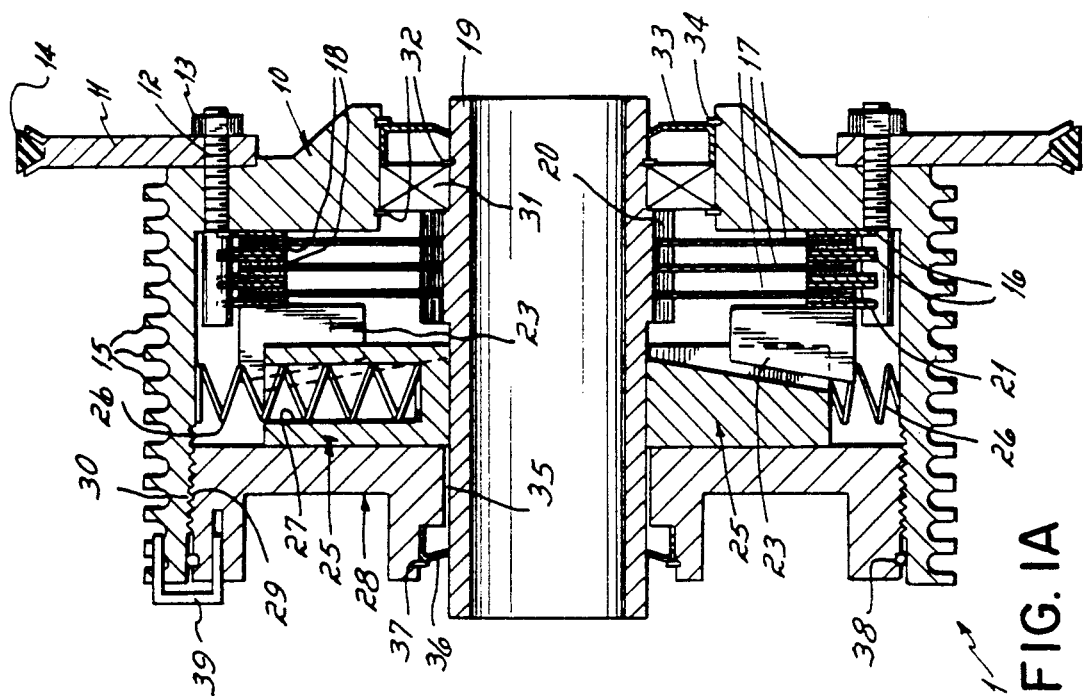
FIG. 1B is a view similar to FIG. 1A but with the adjustment collar having been turned to move the centrifugal weights closer to the pressure plate to decrease the clutch engagement speed.
Figure 2:
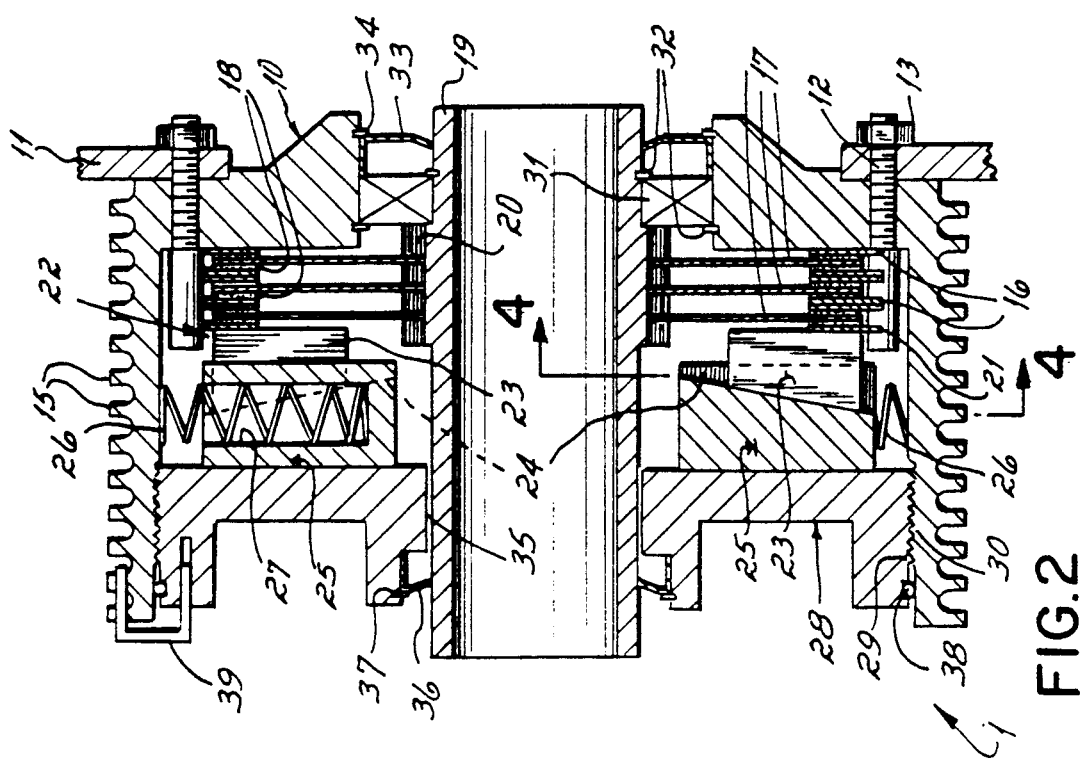
FIG. 2 is a view similar to FIG. 1A but with the centrifugal weights having translated radially upon the clutch having attained the clutch engagement speed.

Referring first to FIGS. 1-2, there is illustrated a centrifugal clutch assembly 1 embodying the present invention A rotating input housing 10 is shown having a driving pulley 11 attached thereto and secured by way of a plurality of threaded studs 12 and nuts 13. A V-belt 14 drives the pulley 11 and hence the housing 10 and is driven, itself, by any suitable driving means. Fins 15 circumferentially encircling the housing 10 are utilized to dissipate heat to the ambient air. A plurality of clutch rings 16 are keyed for rotation with the input housing 10. Disposed intermediate of each pair of clutch rings 16 is the peripheral edge of a clutch disk 17. The peripheral edge of this clutch disk 17 may be lined with any suitable frictional lining 18. These clutch disks 17 are splined to an output shaft 19 via splines 20.

The lowermost clutch ring 21 has fixedly attached thereto, as by welding 21', a pressure plate 22, which defines on its lower side a radially extending downwardly sloping surface. Rather than being of one-piece construction, this pressure plate 22 could take the form of radially extending and downwardly sloping guide projections 23 which are accepted within notches 24 contained within the upper sides of a plurality of centrifugal weights 25. Of course, each of the guide projections 23 would be made an integral part of the lowermost clutch ring 21, as by welding. Should manufacturing or fabrication concerns dictate otherwise, the guide projections 23 could be made an integral part of a ring with the ring itself being fixedly connected, as by welding, to the lowermost clutch ring.

Figure 3:
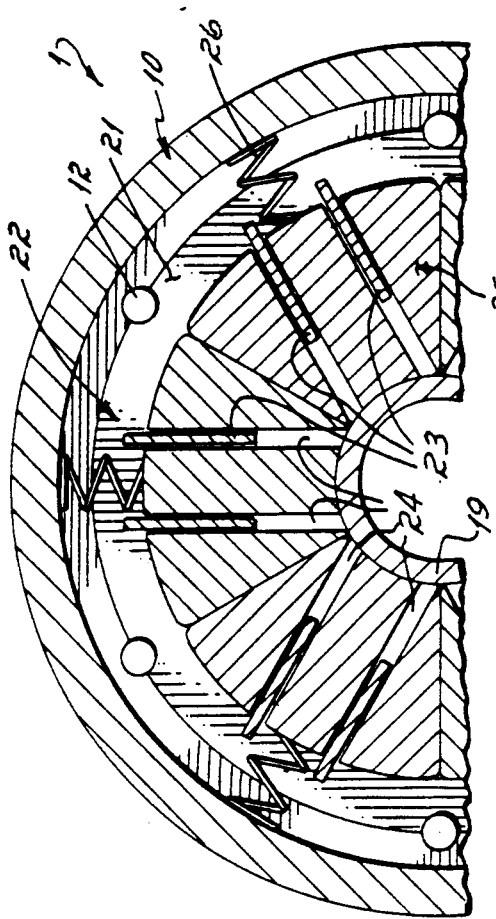
FIG. 3 is a view taken along lines 3—3 of FIG. 1B.
Figure 4:
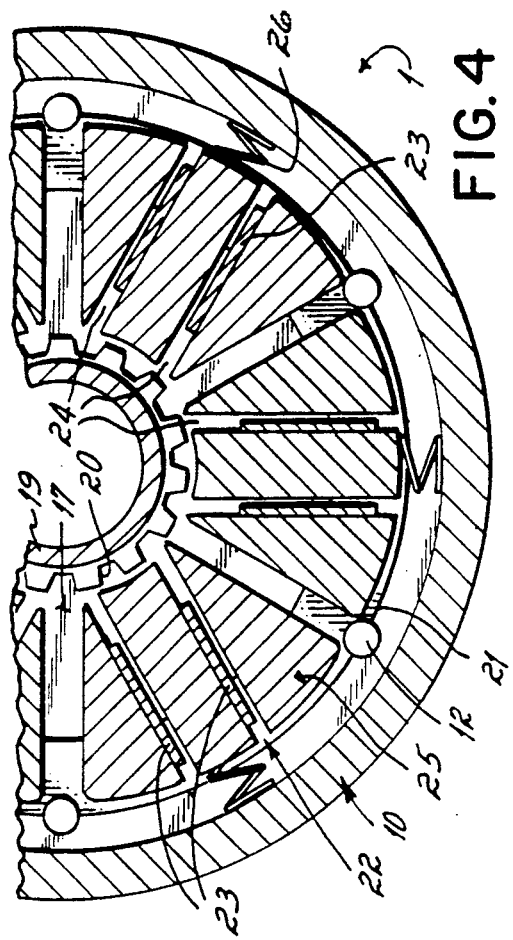
FIG. 4 is a view taken along lines 4-4 of FIG. 2.
Figure 5:
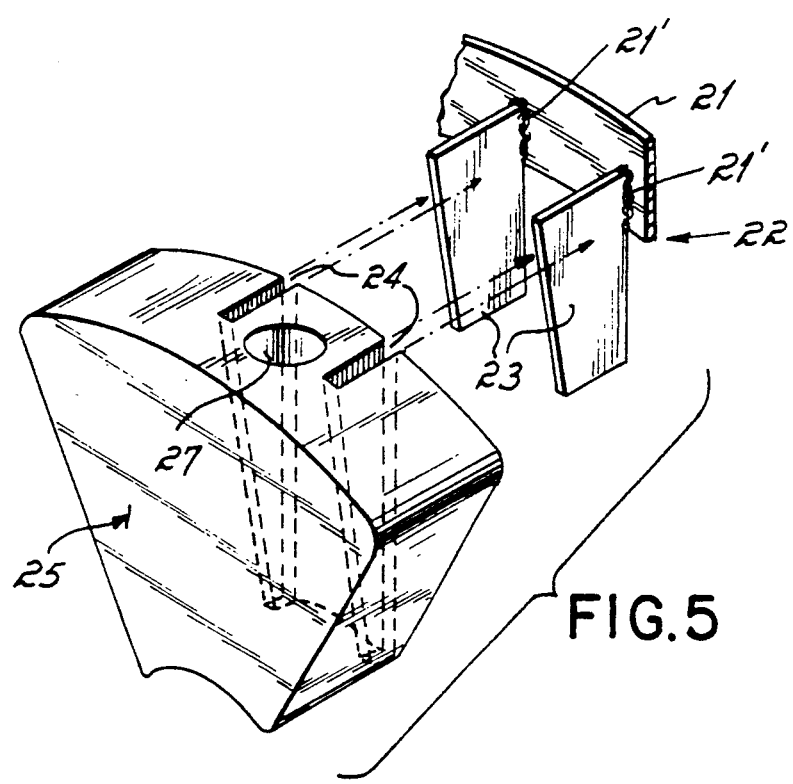
FIG. 5 is a partial isometric exploded view of one centrifugal weight and its cooperating segment of the pressure plate.

As perhaps best illustrated in FIGS. 3-5, the weights 25 with notches 24 therein being cooperable with the guide projections 23 are spring biased away from the input housing 10 via compression springs 26 and preferably against the output shaft 19 when the input housing 10 is at zero angular velocity. These springs 26 are received within holes 27 within the weights 25.

Abutting the lower sides of the weights 25 is the upper side of an adjustment collar 28. While most nearly any suitable means of indexing the adjustment collar 28 with respect to the input housing 10 may be employed, perhaps the most desirable method is to thread the mating members as shown in FIGS. 1-2. The adjustment collar 28 is shown as being externally threaded with threads 29 which mate with the input housing internal threads 30. As can be seen with reference to FIGS. 1A and 1B in sequential order, as the adjustment collar 28 is threadably advanced upwardly within the housing 10 via threads 29 and 30, the centrifugal weights 25 are translated upwardly, the effect being to reduce the distance between the radially extending and outwardly sloping notches 24 of the weights 25 with respect to the radially extending and downwardly sloping guide projections 23.

At the upper end of the input housing a bearing 31 is illustrated upon which is supported the output shaft 19 within the input housing 10. This bearing 31 is held in place with snap rings 32. A lip seal 33 is provided to retain automatic transmission fluid within the input housing 10, and is held in place with snap rings 34. At the lower end of the assembly, a bearing surface 35, being a apart of the adjustment collar 28, is illustrated. Lip seals 36 are also provided at this lower end, and are held in place with snap rings 37.

To prevent seepage of the automatic transmission fluid from between the threads 29 and 30 of the adjustment collar 28 and input housing 10, an O-ring 38 is provided below the lowermost portion of these threads. After selective adjustment of the collar 28, and to retain the adjustment collar 28 in the selected position, a collar clip 39 is secured between the collar 28 and the input housing 10 to prevent relative rotational movement therebetween.

Referring now to FIGS. 3-5, the centrifugal weights 25 are illustrated as having a pair of notches 24 thereon, within which are receivable the guide projections 23. Perhaps the clearest illustration of these features may be had by reference to FIG. 5.

Describing now the operation of the present invention, as the angular velocity of input housing 10 increases, likewise the centrifugal force developed in each of the centrifugal weights 25 increases. When this centrifugal force, being a function of the square of the input housing angular velocity, exceeds the preload force in the compression springs 26, being a function of the spring constant and preload deflection, these weights 25 begin to radially translate outwardly. These weights 25 continue to translate radially outwardly until their radially extending and downwardly sloping notches 24 contact the radially extending and downwardly sloping guide projections 23. From that point on, further outward radial movement of the weights 25 effects upward translation of the pressure plate 22 via the thrust on the guide projections 23. In other words, these notches 24 move radially outwardly to effectively wedge these guide projections 23 upwardly. The upward thrust of the pressure plate 22 effects compression of each clutch ring pair 16 with clutch disk peripheral edge 17 disposed therebetween. When the frictional force generated between the clutch rings 16 and clutch disks 17, being a function of the pressure plate 22 thrust and the coefficient of friction between the clutch rings 16 and clutch disk friction linings 18, becomes sufficiently large so as to preclude slippage therebetween, the output shaft 19 begins to rotate.

It will be appreciated that continued operation of the clutch assembly 1 will result in wear of the clutch disk linings 18 and clutch rings 16, the inevitable effect of the frictional contact therebetween. Consequently, the pressure plate 22 must, with time, translate a further distance upwardly to compensate for this lost material to produce the same axial thrust. However, for the pressure plate 22 to translate an additional distance upwardly, the weights 25 must translate an additional distance outwardly, which, in effect, requires the input housing 10 to obtain a larger angular velocity, and thus increasing the engagement speed. To avoid an increase in engagement speed, the adjustment collar 28 is rotatably advanced upwardly within the input housing 10. This in effect reduces the radial distance required for the centrifugal weights 25 to travel in order that their radially extending and downwardly sloping notches 24 may contact the radially extending and downwardly sloping guide projections 23. Consequently, a constant engagement speed is thus maintained.

In order to vary the engagement speed of the clutch assembly 1 to effect gross changes in engagement speed, larger movement of the adjustment collar 28 is required and may be made.

Should the combination of weights and springs need to be replaced, a user simply removes the collar clip 39 and twists the adjustment collar 28 out of the input housing 10. The weights 25 and springs 26 therewith readily present themselves for removal, and may quickly be replaced with substitutes.

While I have described only one embodiment of my invention, those skilled in the art will readily recognize adaptations and modifications which can be made to the invention which will result in an improved clutch assembly, but without departing from the spirit or scope of the appended claims. Consequently, I intend to be limited only by those claims.

What is claimed is:

1. A centrifugal clutch comprising
a rotating input housing,
at least one pair of clutch rings fixedly connected within said input housing, said clutch rings including a lowermost clutch ring having a lower side thereon,
a rotatable output shaft,
at least one clutch disk mounted for rotation with said output shaft, each said clutch disk having a peripheral edge disposed intermediate each said pair of clutch rings,
an axially translatable pressure plate having an upper side and a lower side, said pressure plate upper side being fixedly connected to said lower side of said lowermost clutch ring, said pressure plate lower side having means for defining a radially extending downwardly sloping surface,
at least one pair of axially translatable and radially slideable centrifugal weights disposed beneath said pressure plate, each of said weights having an upper side and a lower side, said upper side having means for defining a radially extending and downwardly sloping surface slideably mateable with said pressure plate sloping surface means, said weights biased toward said output shaft via spring means, said sloping surface means of said weights being axially spaced away from said sloping surface means of said pressure plate,
an adjustment collar having an upper side abutting said lower side of each of said weights, and
means for externally and selectively adjusting and locating said adjustment collar axially relative to said input housing, said adjustment collar being operable to variably space said sloping surface means of said weights towards or away from said sloping surface means of said pressure plate.

2. The centrifugal clutch of claim 1 wherein said pressure plate sloping surface means comprises a plurality of guide projections, and wherein each said weight sloping surface means comprises at least one notch, said notches being slideably mateable with said pressure plate guide projections.

3. A centrifugal clutch comprising
a rotating input housing,
at least one pair of clutch rings fixedly connected within said input housing, said clutch rings including a lowermost clutch ring having a lower side thereon,
a rotatable output shaft,
at least one clutch disk mounted for rotation with said output shaft, each said clutch disk having a peripheral edge disposed intermediate each said pair of clutch rings,
means for defining a radially extending downwardly sloping surface on said lower side of said lowermost clutch ring,
at least one pair of axially translatable and radially slideable centrifugal weights disposed beneath said lowermost clutch ring, each of said weights having an upper side and a lower side, said upper side having means for defining a radially extending downwardly sloping surface slideably mateable with said lowermost clutch ring sloping surface means, said weights biased toward said output shaft via spring means, said sloping surface means of said weights being axially spaced away from said sloping surface means of said lowermost clutch ring,
an adjustment collar having an upper side abutting said lower side of each of said weights, and means for externally and selectively adjusting and locating said adjustment collar axially relative to said input housing, said adjustment collar being operable to variably space said sloping surface means of said weights towards or away from said sloping surface means of said lowermost clutch ring.

4. The centrifugal clutch of either claim 1 or claim 2 wherein said means for selectively adjusting and locating said adjustment collar relative to said input housing comprises threads, said input housing being threaded and said adjustment collar being mateably threaded.

5. The centrifugal clutch of claim 3 wherein said lowermost clutch ring sloping surface means comprises a plurality of guide projections, and wherein each said weight sloping surface means comprises at least one notch, said notches being slideably mateable with said clutch ring guide projections.

6. The centrifugal clutch of either claim 1 or claim 3 wherein said spring means comprises at least one radially extending compression spring per said weight.

7. The centrifugal clutch of claim 6 wherein said springs are axially movable with said weights.

8. A centrifugal clutch comprising
a rotating input housing,
at least one pair of clutch rings fixedly connected within said input housing, said clutch rings including a lowermost clutch ring having a lower side thereon,
a rotatable output shaft,
at least one clutch disk mounted for rotation with said output shaft, each said clutch disk having a peripheral edge disposed intermediate each said pair of clutch rings,
an axially translatable pressure plate having an upper side and a lower side, said pressure plate upper side being fixedly connected to said lower side of said lowermost clutch ring, said pressure plate lower side having means for defining a radially extending downwardly sloping surface,
at least one pair of axially translatable and radially slideable centrifugal weights disposed beneath said pressure plate, each of said weights having an upper side and a lower side, said upper side having means for defining a radially extending and downwardly sloping surface slideably mateable with said pressure plate sloping surface means, said weights biased toward said output shaft via spring means, said sloping surface means of said weights being axially spaced away from said sloping surface means of said pressure plate,
an adjustment collar having an upper side abutting said lower side of each of said weights,
means for selectively adjusting and locating said adjustment collar axially relative to said input housing, said adjustment collar being operable to variably space said sloping surface means of said weights towards or away from said sloping surface means of said pressure plate,
said spring means comprising at least one radially extending compression spring per said weight, and
said compression springs being operable to bias said weights against said output shaft.

9. A centrifugal clutch comprising
a rotating input housing,
at least one pair of clutch rings fixedly connected within said input housing, said clutch rings including a lowermost clutch ring having a lower side thereon,
a rotatable output shaft,
at least one clutch disk mounted for rotation with said output shaft, each said clutch disk having a peripheral edge disposed intermediate each said pair of clutch rings,
means for defining a radially extending downwardly sloping surface on said lower side of said lowermost clutch ring,
at least one pair of axially translatable and radially slideable centrifugal weights disposed beneath said lowermost clutch ring, each of said weights having an upper side and a lower side, said upper side having means for defining a radially extending downwardly sloping surface slideably mateable with said lowermost clutch ring sloping surface means, said weights biased toward said output shaft via spring means, said sloping surface means of said weights being axially spaced away from said sloping surface means of said lowermost clutch ring.
an adjustment collar having an upper side abutting said lower side of each of said weights,
means for selectively adjusting and locating said adjustment collar axially relative to said input housing, said adjustment collar being operable to variably space said sloping surface means of said weights towards or away from said sloping surface means of said lowermost clutch ring,
said spring means comprising at least one radially extending compression spring per said weight, and
said compression springs being operable to bias said weights against said output shaft.

* * * * *